UNITED STATES PATENT OFFICE 2,186,070

SUBTRACTIVE COLOR FILM

Gerd Heymer, Wolfen, Kreis Bitterfeld, Germany, assignor, by mesne assignments, to Agfa Ansco Corporation, Binghamton, N. Y., a corporation of Delaware No Drawing. Application November 3, 1937, Serial No. 172,652. In Germany November 6, 1936

5 Claims. (Cl. 95—2)

The present invention relates to subtractive color films.

One of its objects is to provide an improvement in a process of producing subtractive color films. Further objects will be seen from the following detailed description.

A known device in cinematography consists in causing a scene to become increasingly darker and finally to end in complete darkness. This "fading-out" is arranged already during the taking of the film either by gradually making the whole field of vision uniformly darker or by alteration of diaphragms having circular or straight or otherwise shaped boundaries which move uniformly from the edges of the picture towards the centre or in the reverse direction. In the case of black-and-white films this can be done without any undesired secondary effect on the positive film which is later prepared for projection. This is not the case, however, when the picture is taken on a subtractive multi-color film, particularly when the picture is to consist of pure dyestuff images without any embedded silver image. Since the gradation curves of the individual emulsion layers contributing to the synthesis of the picture do not coincide or at least do not run parallel in all zones of exposure, it generally happens that a correct adjustment of the colors in the several layers yielding in conjunction a grey is only found over a relatively small range of exposures. A variation in the exposure in either direction from this range then results in a predominance of one of the colors. Thus, if a scene on a multi-color material of this kind is faded out it becomes for example greener as it darkens. In the case of a picture exposed under normal conditions or under conditions which differ only to a small extent from the normal the eye does not perceive the variation of the grey or black shades from neutral grey, which occurs in this case in a small degree, because owing to the contrast between the dark portions and the light portions the former always appear black even though in reality they are only very dark but yet distinctly colored. As the scene fades out, however, the whole picture passes gradually into the dark color which is now perceptible to the eye since the contrast is now lacking.

By this invention this fault in the fading-out can be corrected by giving the film in the regions of the desired fading-out an additional coloring with a pure black or grey dyestuff or with a dyestuff whose color is complementary to the incorrectly predominating color. In the type of fading-out consisting in a uniform darkening of the whole field of vision the desired result can be obtained by progressively increasing the duration of immersion of the film in the dyestuff solution or by applying by means of a roller a solution of increasing concentration (or vice versa). In the case of fading-out produced by movement of the boundary of the picture, that is to say for instance by means of a concentric darkening proceeding from the edges of the picture towards the centre, the additional color must be applied separately to each picture, if required with the assistance of stencils, either by hand or by means of a suitable machine; or the dyestuff may be printed by means of one of the known imbibition processes. This process is, of course also applicable to the case in which the coloring is applied homogeneously. A film which has been taken in the normal manner without fading-out can also subsequently have a fading-out effect imparted to it; for this purpose the dyestuff picture maintains its normal density and only the additional coloring is increased in density until it is finally black.

What I claim is:

1. In a process of producing fade-outs in a subtractive 3-color motion picture film containing three differently colored dye images, in which the fade-outs are produced by decreasing the exposure of successive frames of the color image record, the improvement which consists in uniformly applying to each of said frames an additional dye complementary in light-absorption to the color tending to predominate and in such quantity as to give a neutral black with said color.

2. The process as defined in claim 1, wherein said additional dye is applied with the aid of an imbibition method.

3. The process as defined in claim 1, wherein said additional dye is applied by hand with a stencil.

4. The process as defined in claim 1, wherein said additional dye is applied by dyeing with a variation in the period of dyeing.

5. The process as defined in claim 1, wherein said additional dye is applied by dyeing with a variation of the concentration of the dye.

GERD HEYMER.